United States Patent [19]

Cox

[11] Patent Number: 4,718,740
[45] Date of Patent: Jan. 12, 1988

[54] HOUSING AND STOWAGE MECHANISM FOR TERMINAL KEYBOARD AND DISPLAY PANEL

[75] Inventor: Ronald E. Cox, Margate, Fla.

[73] Assignee: Allied Corporation, Morristown, N.J.

[21] Appl. No.: 924,079

[22] Filed: Oct. 28, 1986

[51] Int. Cl.⁴ ............................................. A47B 88/00
[52] U.S. Cl. .................................... 312/208; 312/313; 312/325
[58] Field of Search ............... 312/324, 325, 326, 328, 312/313, 315, 271, 272, 272.5, 273, 22, 242, 208

[56] References Cited

U.S. PATENT DOCUMENTS

| | | | |
|---|---|---|---|
| 506,474 | 10/1893 | Corsini | 312/272.5 |
| 833,687 | 10/1906 | Herzog | 312/315 |
| 1,262,789 | 4/1918 | Heller | 312/315 |
| 1,768,413 | 6/1930 | Lyth | 312/313 |
| 2,340,762 | 2/1944 | Lundin | 312/315 |
| 3,575,483 | 4/1971 | Church | 312/325 |
| 4,168,871 | 9/1979 | Dierkes | 312/324 |
| 4,316,082 | 2/1982 | Fritz | 312/313 |

Primary Examiner—Victor N. Sakran
Attorney, Agent, or Firm—Bruce L. Lamb; Robert M. Trepp

[57] ABSTRACT

A housing and stowage mechanism for a terminal key board and data display. A rectangular housing mounted vertically on a wall has a front face hinged along the lower edge for opening to a horizontal position. A keyboard is mounted on the upper portion of the housing face interiorly of the housing. A data display panel is pivotally suspended from the lower edge of the keyboard. A mechanism activated by the front face engages the lower edge of the display panel and elevates the panel to an angle inclined for convenient viewing when the front face is lowered to a horizontal position.

5 Claims, 6 Drawing Figures

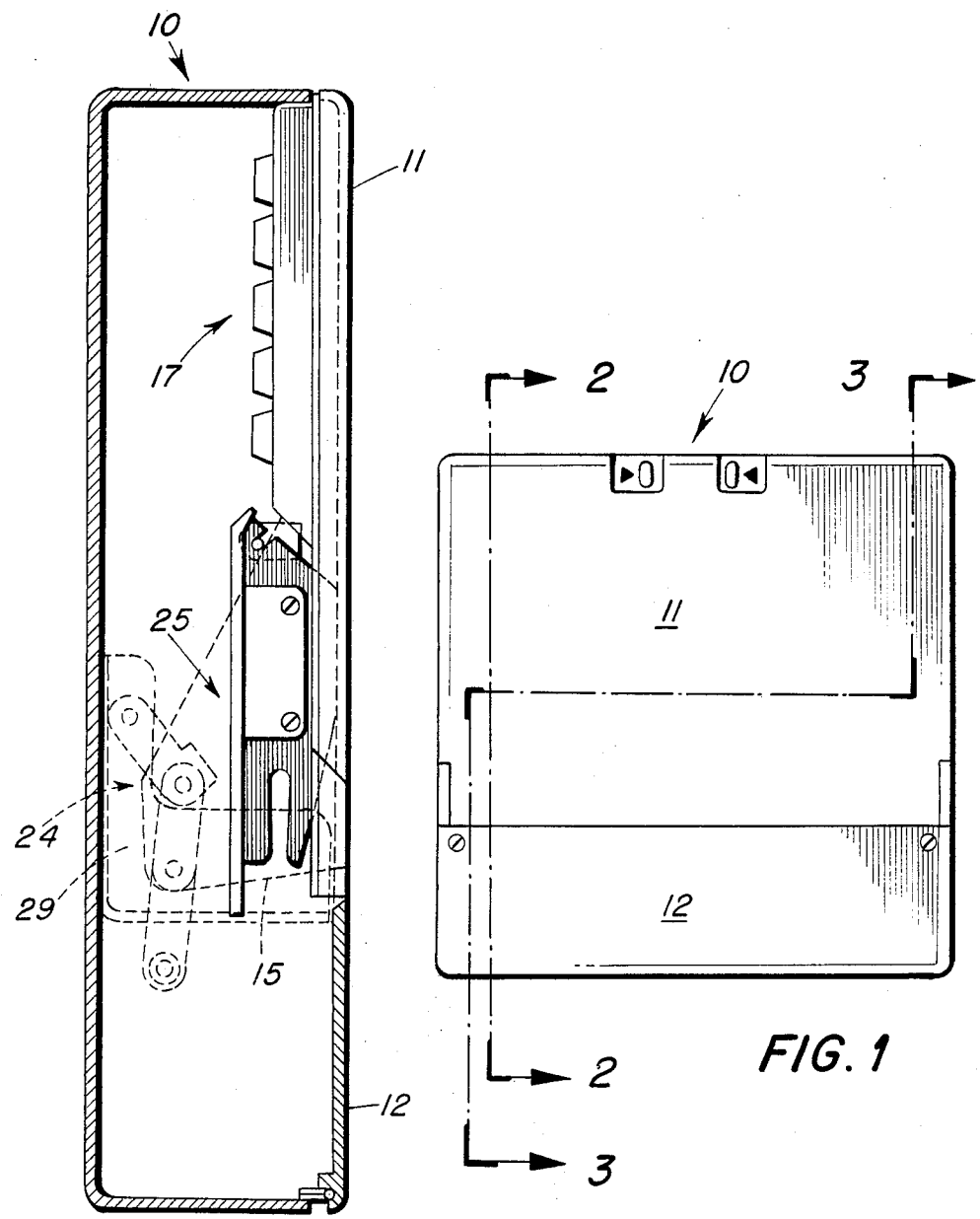

HOUSING AND STOWAGE MECHANISM FOR TERMINAL KEYBOARD AND DISPLAY PANEL

The present invention relates to a stowage device for a keyboard and display terminal. More particularly, it relates to a housing and retraction mechanism which permits folding a keyboard and display into a compact, wall mounted housing during periods of non-use and which positions the keyboard and display conveniently for viewing and operation from a standing or sitting position upon opening the housing for use.

The invention is intended primarily for application in the ACARS system, a digital data link communications system used by airlines. Airline cabin attendants are increasingly employing ACARS to transmit messages concerning passengers, scheduling, stores provisioning and the like to improve the efficiency of airline operation, the quality of the services provided and to reduce the burden of voice communications.

For best service, the ACARS terminal, which resembles a computer keyboard and display, must be accessible in the passenger cabin of an aircraft. It should not intrude into the space occupied by passengers when not in use and it should be available for comfortable and accurate viewing and operation when its use is desired.

Accordingly, it is an object of the invention to provide a terminal for a digital data communications system which may be stowed in a compact, non-intrusive housing for protection against unauthorized use and damage when not in use and which may be made available rapidly for convenient operation when its use is desired.

It is another object of the invention to provide a wall mounted housing having a hinged outer face which may be opened to provide a horizontal support for a terminal keyboard and which includes means operated by opening the housing for elevating a display panel to a comfortable viewing angle.

BRIEF DESCRIPTION

Briefly, the invention comprises a shallow, rectangular housing adapted for mounting on a wall or bulkhead of an aircraft passenger cabin. The face of the housing is hinged at the lower edge for lowering to a horizontal position. A terminal keyboard is secured at the upper end of the inner side of the housing face and terminal display panel is pivotally secured at one edge to the lower edge of the keyboard so as to be suspended thereby within the housing when the housing is closed.

A mechanism contained within the housing is actuated by opening the housing to engage the dependent end of the display panel and elevate the display panel to an inclined angle. The mechanism also serves as a stop to prevent overtravel of the housing face and to add rigidity to the keyboard support.

When the housing face is lowered to an open horizontal position, a shelf is formed upon which the keyboard is presented along the outward portion of the shelf with the display panel extending along the inner edge of the keyboard and elevated thereabove at an inclined angle convenient for viewing.

DESCRIPTION OF THE DRAWINGS

FIG. 1 is a front elevation of the housing of the invention in closed position;

FIG. 2 is a vertical section along line 2—2 of FIG. 1 showing the keyboard and display panel contained in the housing, with parts of the mechanism for elevating the display panel shown in phantom;

DETAILED DESCRIPTION

Figures 3, 4:
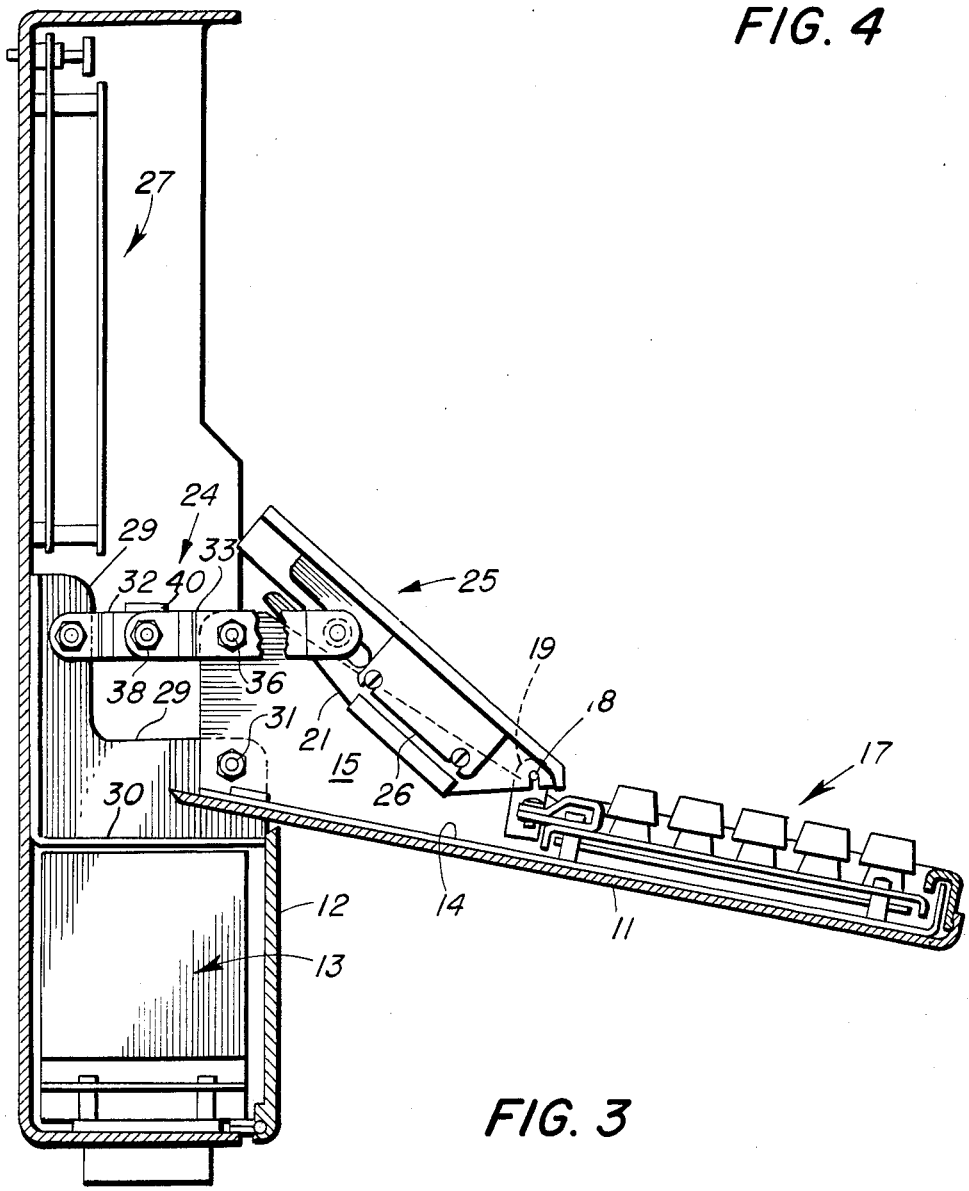
FIG. 3 is a vertical section taken generally along line 3—3 of FIG. 1, when the housing is in the opened position.
FIG. 4 is a partial plan view of the support bracket, display panel elevating mechanism and keyboard support tray at the left hand side of the housing, as viewed in FIG. 1.
Figure 5:
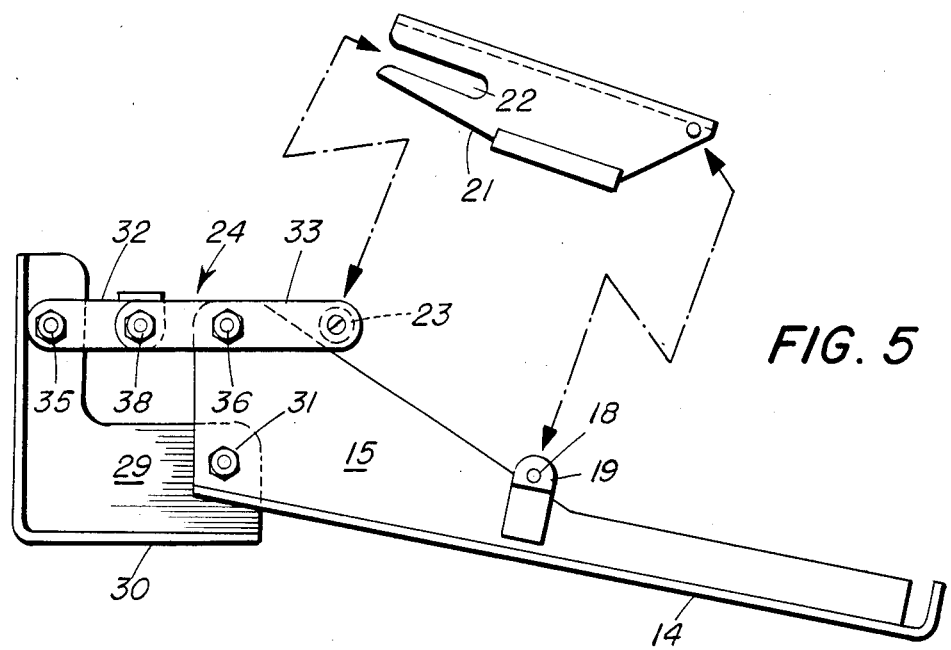
FIG. 5 is a section similar to FIG. 3, but showing only the support bracket, display panel elevating mechanism, keyboard support tray and display panel support disassembled from the keyboard support tray.

Referring to FIGS. 1, 2 and 3, the invention comprises a shallow rectangular housing 10 adapted for vertical mounting on a wall of an aircraft passenger cabin. The front face of the housing includes a pivotally mounted upper portion 11 and a fixed lower portion 12 which is removable for access to components 13 located within the lower portion of the housing. Referring to FIG. 3, housing face 11 is secured to a keyboard mounting tray 14 having upturned side flanges 15, best seen in FIG. 5. A keyboard 17 is secured to the outward portion of tray 14. Referring to FIGS. 4 and 5, a pivot pin 18 is secured to tray flange 15 by a bracket 19 in line with the inner edge of keyboard 17. A display panel mounting bracket 21, best seen in FIG. 5, is pivotally secured at one end to pivot pin 18. A U-shaped slot 22 extends into bracket 21 at the end opposite pivot pin 18. Slot 22 is engaged by a flanged bushing 23 on the display panel elevating mechanism 24, as will later be described.

A liquid crystal display panel 25 is secured to mounting bracket 21 by flange 26. When the housing 10 is in the closed position (FIG. 2), display panel 25 is suspended from pivot pin 18 below keyboard 17. The space within the housing between the keyboard and display panel and the back wall of the housing is occupied by printed circuit boards and other electronic components 27, seen in FIG. 3, but omitted from FIG. 2 for clarity.

Referring particularly to FIGS. 4 and 5, a flanged L-shaped bracket 29 is secured to the back wall of housing 10 with the lower flange 30 of the bracket substantially in line with the upper edge of housing face 12. Tray 14 is pivotally secured to bracket 29 by a pivot stud and nut 31 secured near the forward end of bracket 29 and passed through the lower corner of tray flange 15.

The display elevation mechanism 24 comprises links 32 and 33. Link 32 is pivotally secured at one end to bracket 29 by a stud and nut 35 located near the upper end of bracket 29. Link 33 is pivotally secured near the midpoint thereof to tray flange 15 by a stud and nut 36 located near the upper corner of flange 15. Links 32 and 33 are pivotally joined at their meeting ends by a stud and nut 38 carried by a plate 39, the upper edge of which is turned horizontally to form a flange 40 which overlaps the upper edges of both links 32 and 33 at the joined ends thereof. Link 33 is thereby constrained against counterclockwise rotation about stud 36 but is unconstrained by flange 40 from clockwise rotation. Bushing 23 is rotatably mounted at the end of link 33 on the side thereof facing bracket 21. As seen in FIG. 4, an opening 42 is provided in the lower flange 30 of bracket 29 to provide clearance for the bushing end of link 33 when tray 14 is moved to the closed, vertical position.

Figure 6:
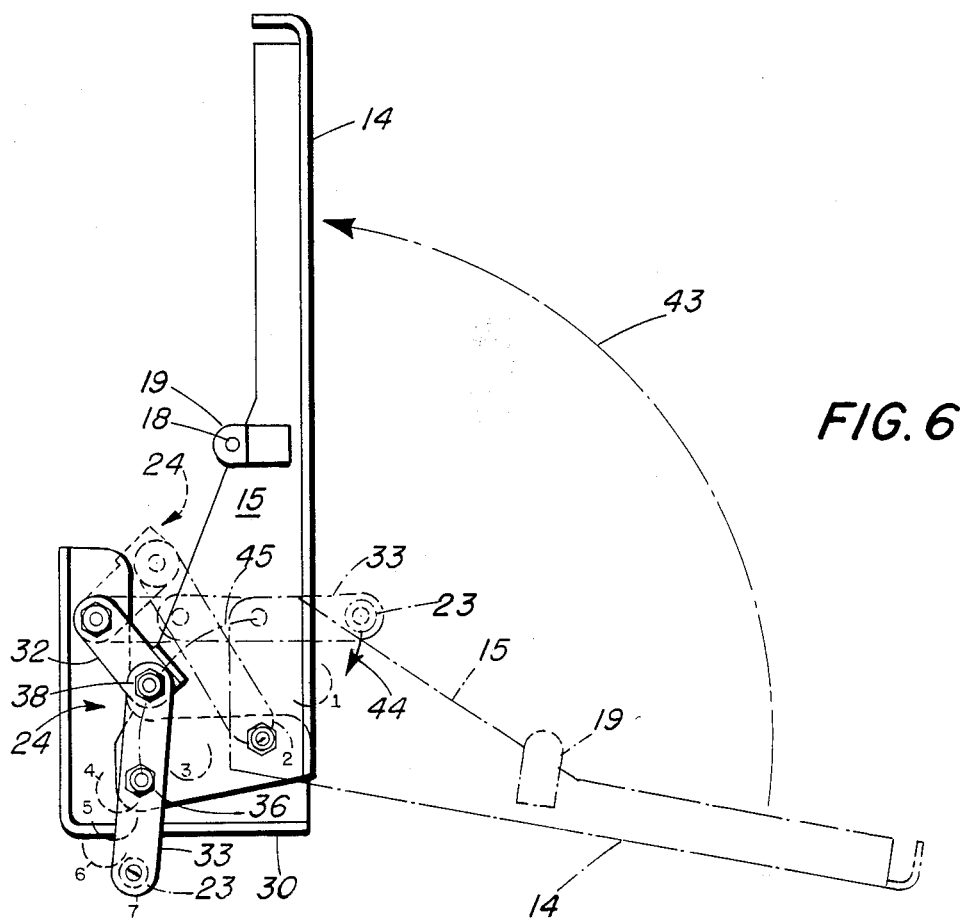
FIG. 6 is a view similar to FIG. 5 showing the motion of the display panel elevating mechanism in moving from open to closed positions of the housing.

FIG. 6 shows the motion of mechanism 24 when tray 14 is moved from an open to a closed position. In a fully open position, links 32 and 33 are aligned horizontally on dead center at pivot 38. An upward force applied to tray 14 tending to move the tray in the direction of arrow 43 imparts a reaction at bushing 23 tending to rotate link 33 clockwise about pivot 36 in the direction of arrow 44. The force imparting the reaction at bushing 23 is transmitted from tray 14 through bracket 21 (not shown). When pivot 38 is urged off center by the reaction at bushing 23, continued upward motion of tray 14 rotates pivot 36 counterclockwise about pivot 31 and causes pivot 36 to travel along locus 45. Pivot 38 initially moves upward and then descends as the onward motion of pivot 36 causes link 33 to move through the successive positions 1–7. Approximately at position 2, bushing 23 becomes disengaged from slot 22 of bracket 21 and bracket 21, and display panel 25 mounted thereon, is thereafter freely suspended from pivot 18. In the final closed position, tray 14 is vertical and mechanism 24 is disposed in position 7 and as is shown in FIG. 2 in phantom. When the housing is opened, tray 14 moves in the direction opposite that shown in FIG. 6 and the motion of mechanism 24 is reversed, travelling from position 7 to position 1. In the reverse course, bushing 23 becomes re-engaged in slot 22 of bracket 21 approximately at position 2 and continued downward motion of tray 14 causes bracket 21 and display panel 25 to be elevated to the inclined position shown in FIG. 3.

It will be understood that mechanisms 24 and the parts cooperating therewith are provided at both the right and left sides of the housing and that the mechanisms differ from one another only in such respects as may be dictated by their chirality. Obviously, the invention may be practiced otherwise than as specifically disclosed without departing from the spirit and scope of the appended claims.

The invention claimed is:

1. A housing and stowage mechanism for a terminal keyboard and data display panel, comprising a housing having a generally rectangular body including a back and a face and relatively narrow surrounding sides, said housing being adapted for mounting vertically with the back thereof against a vertical support;

hinge means pivotally securing said housing face to said housing body near the lower edge of said housing face to permit lowering of said face from a closed, vertical position to an open, substantially horizontal position;

means for securing a terminal keyboard to said housing face upon a portion thereof opposite said hinge meand and upon the surface thereof facing said housing back;

means for securing a display panel pivotally to said housing face upon a portion thereof between said keyboard and said hinge means and upon the same surface thereof as said keyboard, said panel securing means being located near the edge of said panel adjacent said keyboard; and a mechanism linked to said housing face and actuated by motion of said housing face from a closed to an open position for elevating the edge of said display panel opposite said panel securing means above the level of said panel securing means when said housing face is in an open, substantially horizontal position, said mechanism including:

first and second links pivotally joined together at one end of each said link;

means pivotally securing said first link to said housing body at the end thereof opposite said second link;

means pivotally joining said second link to said housing face at a point intermediate the ends of said second link, the end of said second link opposite said first link being free to rotate and translate during lowering of said housing face from a vertical position to a horizontal position; and means at said opposite end of said second link for engaging said edge of said display panel opposite said panel securing means.

2. Apparatus as claimed in claim 1 wherein said means pivotally joining said second link to said housing face comprises:

a flange extending vertically upward from said housing face near the edge of said face adjacent said housing when said face is in a horizontal position; and a pivot joint secured to said flange near an edge thereof remote from said face and secured to said second link at said intermediate point thereof.

3. Apparatus as claimed in claim 2 wherein said hinge means includes;

an L-shaped bracket having one leg thereof secured vertically to said back of said housing with the other leg thereof extending horizontally toward said face of said housing; and pivot means located near the end of said other leg of said bracket for joining said flange to said bracket at a point on said flange adjacent said face of said housing.

4. Apparatus as claimed in claim 3 wherein said means pivotally securing said first link to said housing body comprises:

a pivot joint secured to said end of said first link opposite said second link and secured to said one leg of said bracket near the end of said one leg.

5. Apparatus as claimed in claim 2 wherein said means for engaging said edge of said display panel comprises;

a flanged bushing secured to said opposite end of said second link near the end thereof; and a panel bracket depending perpendicularly from the plane of said display panel, said panel bracket defining a U-shaped slot extending parallel to the plane of said display panel with the open end of said slot adjacent said edge of said display panel opposite said panel securing means, said panel bracket being located relative to said mechanism so as to enable said flanged bushing to enter and travel in said slot during a portion of the motion of said second link when said housing face is moved from a closed to an open position.

* * * * *